(12) United States Patent
Hinton

(10) Patent No.: US 10,904,410 B2
(45) Date of Patent: Jan. 26, 2021

(54) ILLUMINATED CLAPPERBOARD

(71) Applicant: Locomocean Limited, London (GB)

(72) Inventor: Richard David Hinton, London (GB)

(73) Assignee: Locomocean Limited, London (GB)

( * ) Notice: Subject to any disclaimer, the term of this patent is extended or adjusted under 35 U.S.C. 154(b) by 0 days.

(21) Appl. No.: 16/093,880

(22) PCT Filed: Apr. 13, 2017

(86) PCT No.: PCT/EP2017/059043
§ 371 (c)(1),
(2) Date: Oct. 15, 2018

(87) PCT Pub. No.: WO2017/178639
PCT Pub. Date: Oct. 19, 2017

(65) Prior Publication Data
US 2019/0109964 A1 Apr. 11, 2019

(30) Foreign Application Priority Data

Apr. 15, 2016 (GB) .................................... 1606668

(51) Int. Cl.
| | | |
|---|---|---|
| *H04N 5/222* | (2006.01) | |
| *G03B 31/04* | (2006.01) | |
| *G03B 17/56* | (2006.01) | |
| *G09F 13/04* | (2006.01) | |
| *G03B 15/06* | (2006.01) | |

(Continued)

(52) U.S. Cl.
CPC ............. *H04N 5/222* (2013.01); *F21V 21/30* (2013.01); *G03B 15/06* (2013.01); *G03B 17/56* (2013.01); *G03B 31/04* (2013.01); *G09F 13/04* (2013.01); *H04N 21/8547* (2013.01)

(58) Field of Classification Search
CPC .. H04N 21/8547; F21V 21/30; G02B 6/0075; G02B 6/0076; G02B 6/0078
See application file for complete search history.

(56) References Cited

U.S. PATENT DOCUMENTS

| | | | |
|---|---|---|---|
| 5,457,507 A | | 10/1995 | Berardi |
| 5,638,151 A | * | 6/1997 | Berardi .................. G03B 31/00 340/332 |

(Continued)

FOREIGN PATENT DOCUMENTS

| | | |
|---|---|---|
| CN | 202334697 U | 7/2012 |
| CN | 105227806 A | 1/2016 |
| JP | 2004-264632 A | 9/2004 |

OTHER PUBLICATIONS

"How to Make a Movie Clapperboard" by "Joseph_HD_ATL" and posted on the Home Depot Community Forums on Mar. 26, 2012. (Year: 2012).*

(Continued)

*Primary Examiner* — Diane I Lee
*Assistant Examiner* — Zachary J Snyder
(74) *Attorney, Agent, or Firm* — Chamberlain, Hrdlicka, White, Williams & Aughtry

(57) ABSTRACT

There is disclosed herein a device 1000 comprising: a lower lightbox 100; and an upper lightbox 300 arranged on top of the lower lightbox and connected thereto at one side by a hinge. The device may be operated as a clapperboard and may also function as a lightbox for providing direct or ambient lighting to its surroundings.

28 Claims, 12 Drawing Sheets

(51) Int. Cl.
*F21V 21/30* (2006.01)
*H04N 21/8547* (2011.01)

(56) References Cited

U.S. PATENT DOCUMENTS

| | | | |
|---|---|---|---|
| 6,831,729 B1 * | 12/2004 | Davies | G03B 21/32 352/12 |
| 2005/0190551 A1 | 9/2005 | Rempel | |
| 2005/0245313 A1 | 11/2005 | Yoshino et al. | |
| 2007/0115650 A1 | 5/2007 | Cohan et al. | |
| 2009/0295976 A1 | 12/2009 | Choi | |
| 2011/0254470 A1 | 10/2011 | Penoyer | |

OTHER PUBLICATIONS

International Search Report issued in corresponding Application No. PCT/EP2017/059043, dated May 29, 2017 (4 pages).
Written Opinion issued in corresponding Application No. PCT/EP2017/059043, dated May 29, 2017 (6 pages).
Search Report under Section 17(5) issued in corresponding GB Application No. 1606668.0, dated Aug. 23, 2016.

* cited by examiner

ILLUMINATED CLAPPERBOARD

TECHNICAL FIELD

The present invention relates to an illuminated clapperboard or a lightbox formed as a clapperboard.

BACKGROUND

Clapperboards are widely used in the film and television industry to assist in synchronising the picture and sound, and to designate and mark particular scenes and takes recorded during a production.

In film making, sound and picture were, and still often are, recorded separately, and the respective audio and video tracks then have to be synchronised. The sharp "clap" noise that the clapperboard makes can be identified easily on the audio track, and the shutting of the clapstick can be identified easily on the video track. The timing of the two tracks can then be precisely matched to synchronise the sound and picture.

The traditional design of a clapperboard consists of a wooden slate and a hinged clapstick attached to the top of the slate. More recently, clapperboards have been designed which use a pair of wooden clapsticks mounted to the top of whiteboard or translucent acrylic glass slates which do not require additional lighting from the camera side to be legible. Smart slates or digislates are electronic SMPTE time code versions with LED numbers.

The clapsticks traditionally have diagonally interleaved lines of black and white to ensure a clear visual of the clap under most lighting conditions. In recent years, sticks with calibrated color stripes have also become available.

In use, the details of the next take are written on the slate of the clapperboard. This typically includes the date, the production title, the name of the director, the name of the director of photography (DP) and the scene information such as scene number, camera angle and take number.

A lightbox is a box containing one or more light sources such as a light bulb, LED, or the like, and having at least one surface that is wholly or partially translucent or transparent so that the one or more light sources will illuminate the at least one translucent or transparent surface from within the lightbox, whereby the at least one surface may become more visible in low-light conditions and the lightbox may provide direct and/or ambient lighting to the surrounding area.

SUMMARY OF THE INVENTION

According to the present invention, there is provided a device comprising: a lower lightbox; and an upper lightbox arranged on top of the lower lightbox and connected thereto at one side by a hinge.

In embodiments of the device according to the present invention, the lower lightbox may contains a lower light source and include a wholly or partially translucent or transparent lower cover on a vertical front side thereof, and the upper lightbox may contain an upper light source and include a wholly or partially translucent or transparent upper cover on a vertical front side thereof.

In any of the foregoing or further embodiments of the device according to the present invention, a switch may be arranged to turn on the upper and lower light sources when the hinge is closed and to turn off the upper and lower light sources when the hinge is opened.

The switch may be provided in the lower lightbox and be arranged to be pressed closed when the hinge is closed and to open or be opened when the hinge is opened. The switch may be a microswitch attached to a PCB that is mounted at both sides on PCB mounting points in a housing of the lower lightbox, and the lower lightbox may include a PCB support strut located intermediate of the two mounting points and arranged to support the PCB in the vicinity of the microswitch when a force is applied to press the microswitch closed. In this case, the upper lightbox may include a switch pusher extending from its lower surface and arranged to press the switch closed through a contact hole in the upper surface of the lower lightbox when the hinge is closed. A substantially vertical support strut or rod may also be provided between upper and lower surfaces of a housing of the upper lightbox located substantially above the switch pusher.

As an alternative, the switch may be provided in the upper lightbox and be arranged to be pressed closed when the hinge is closed and to open or be opened when the hinge is opened. The switch may then be a microswitch attached to a PCB that is mounted at both sides on PCB mounting points in a housing of the upper lightbox, and the upper lightbox may include a PCB support strut located intermediate of the two mounting points and arranged to support the PCB in the vicinity of the microswitch when a force is applied to press the microswitch closed. In this case, the lower lightbox may include a switch pusher extending from its upper surface and arranged to press the switch closed through a contact hole in the lower surface of the upper lightbox when the hinge is closed.

In any of the foregoing or further embodiments of the device according to the present invention, the lower lightbox and the upper lightbox may have substantially the same width and depth, such that the lower surface of the upper lightbox substantially coincides with an upper surface of the lower lightbox when the hinge is closed.

In any of the foregoing or further embodiments of the device according to the present invention, the upper lightbox may include an inclined portion adjacent the hinge formed at an angle to the lower surface of the upper lightbox and arranged to contact the upper surface of the lower lightbox to limit the hinge against further opening. The inclined portion may be arranged to limit the opening angle of the hinge to a maximum angle between 10 and 30 degrees, preferably between 12 and 20 degrees, most preferably substantially 13 degrees. The inclined portion may be formed at said maximum angle relative to the lower surface of the upper lightbox.

In any of the foregoing or further embodiments of the device according to the present invention, a front surface of the lower lightbox may be substantially aligned with a front surface of the upper lightbox.

In any of the foregoing or further embodiments of the device according to the present invention, the hinge may be arranged to selectively be held in an open position, and preferably a friction force in the hinge may be adjustable such that friction in the hinge can be set to hold the hinge in the open position, with the upper lightbox rotated relative to the lower lightbox to open a gap between the lower surface of the upper lightbox and the upper surface of the lower lightbox.

In any of the foregoing or further embodiments of the device according to the present invention, the lower lightbox may include a pen-holding recess arranged to hold a pen in a non-horizontal orientation of at least 45 degrees from horizontal, and preferably in a predominantly vertical orientation of not more than 22.5 degrees from vertical, most preferably in a substantially vertical orientation.

In any of the foregoing or further embodiments of the device according to the present invention, the depth of the lower lightbox between its back and front surfaces may be at least 30 mm, preferably at least 40 mm, most preferably at least 50 mm.

In any of the foregoing or further embodiments of the device according to the present invention, the depth of the upper lightbox between its back and front surfaces may be at least 30 mm, preferably at least 40 mm, most preferably at least 50 mm.

In any of the foregoing or further embodiments of the device according to the present invention, the lower lightbox may include a lower housing containing a power source and/or a port for connection to a power source, and the hinge may include a through hole with a wire arranged to pass through it to connect the power source to the upper lightbox. In this case, the upper lightbox may include a hinge arm arranged to be received in a hinge arm recess of the lower lightbox, the hinge arm and the hinge arm recess including substantially vertical through holes for the wire to pass through. As an alternative, the lower lightbox may include a hinge arm arranged to be received in a hinge arm recess of the upper lightbox, the hinge arm and the hinge arm recess including substantially vertical through holes for the wire to pass through. The device may further include a hinge pin, the hinge pin including a substantially vertical through hole for the wire to pass through.

In any of the foregoing or further embodiments of the device according to the present invention, the device may further comprise a magnetic catch to hold the hinge closed with the lower surface of the upper lightbox in contact with the upper surface of the lower lightbox. In this case, the device may comprise a magnetic clasp member mounted inside the lower lightbox adjacent to its upper surface and arranged to be magnetically attracted to a magnetic clasp member mounted inside the upper lightbox adjacent to its lower surface.

In any of the foregoing or further embodiments of the device according to the present invention, the device may include a variable power switch for varying the power supply to the lower and upper lightboxes. The variable power switch may be operable to select between a high power setting and a low power setting, and preferably is further operable to turn off power to the lower and upper lightboxes.

In any of the foregoing or further embodiments of the device according to the present invention, the device may be configured to generate an audible signal when the hinge is closed so as to bring the upper lightbox into contact with the lower lightbox.

The device according to the present invention, and in the foregoing or any further embodiments thereof, may be a clapperboard.

BRIEF DESCRIPTION OF THE DRAWINGS

To enable a better understanding of the present invention, and to show how the same may be carried into effect, reference will now be made, by way of example only, to the accompanying drawings, in which:—

DETAILED DESCRIPTION

Embodiments of the present invention will now be described with reference to the accompanying drawings figures. In the following description, reference is made to specific examples. Nevertheless, it will be appreciated that alternative structures, configurations and arrangements may provide equivalent or identical functionality and the present invention it is intended to encompass all such variations to the extent that they fall within the scope of the appended claims.

In the following, any stated ranges are intended to include the mentioned end values. The acronym PCB refers to a printed circuit board.

An embodiment of an illuminated clapperboard 1000 is shown in FIGS. 1 to 11, 12A and 12B. The clapperboard 1000 may also function as a lightbox for providing direct or ambient lighting to its surroundings. Preferably, front covers 150, 350 of the lower and upper lightboxes are translucent whiteboards that can be written on using a felt pen and subsequently be wiped clean.

In the following, unless otherwise stated, directional references refer to the orientation shown in FIGS. 1, 2 and 6, in which the clapperboard is shown in a standing orientation, with the vertical direction of the page substantially aligned with the vertical orientation of the clapperboard 1000, with upwards being towards the top of the page, the left and right sides being those on the left and right sides of these Figures, and the front or forward face being the major face facing out of the page.

Figure 1:
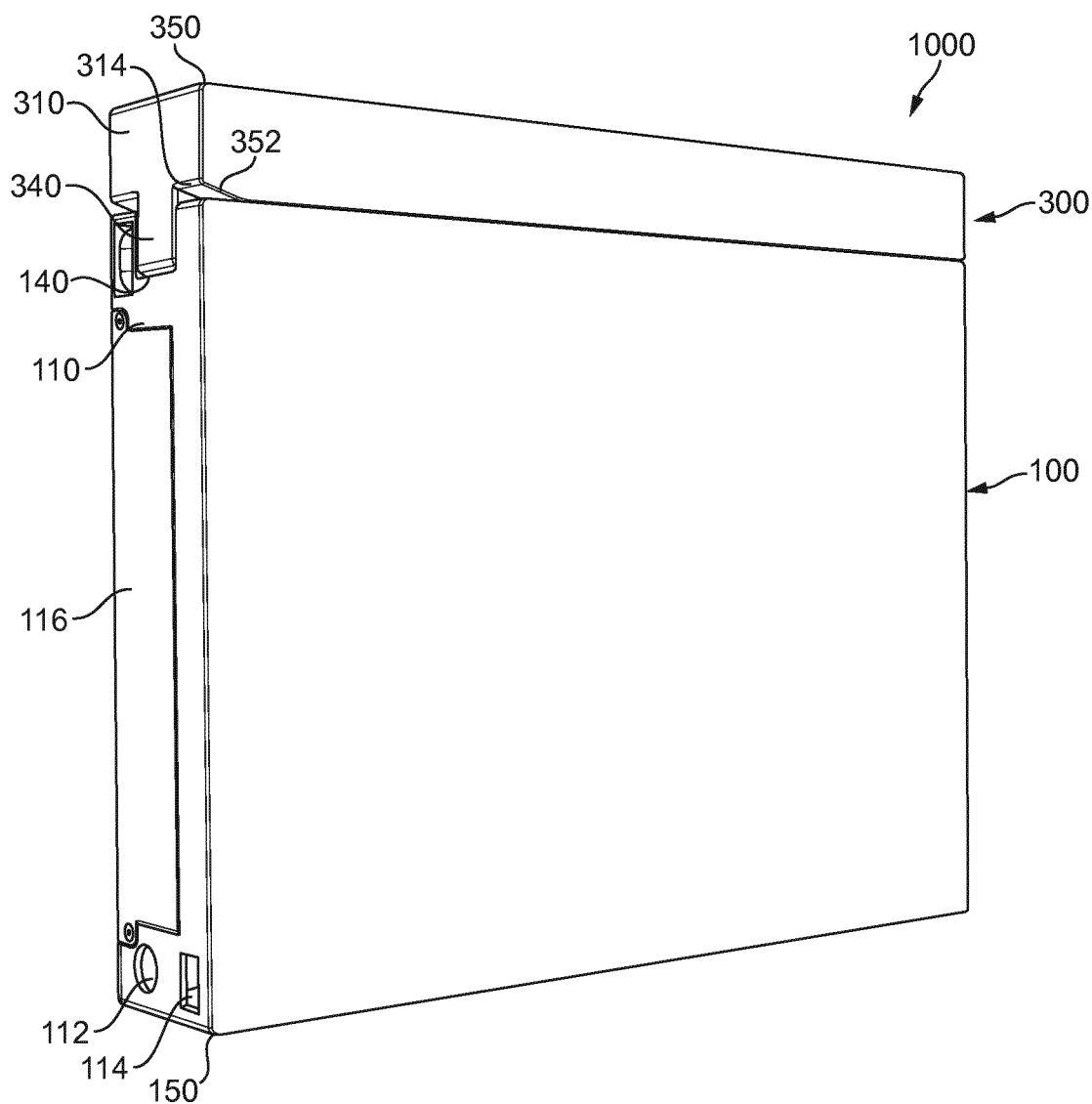
FIG. 1 shows a front perspective view of an embodiment of an illuminated clapperboard, with the clapstick closed.
Figure 2:
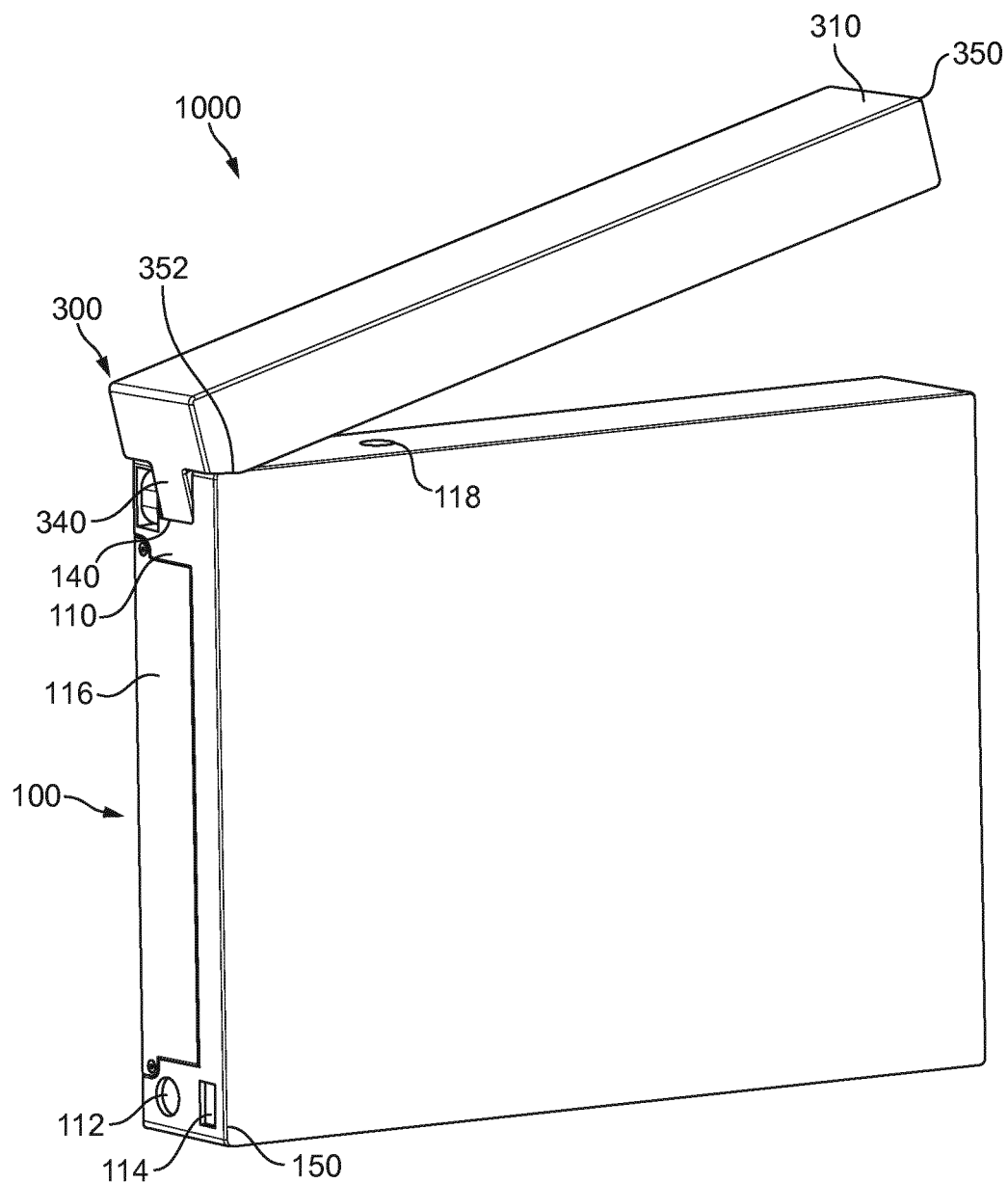
FIG. 2 shows a similar front perspective view of the clapperboard of FIG. 1, with the clapstick open.

As shown in FIG. 1, the illuminated clapperboard 1000 includes an upper lightbox 300 and a lower lightbox 100 which are joined together at a hinge. The upper lightbox 300 forms the clapstick of the clapperboard 1000, whilst the lower lightbox 100 forms the slate.

The upper lightbox 300 includes an upper housing 310, onto the front of which is mounted an upper translucent cover 350. Similarly, the lower lightbox 100 includes a lower housing 110 to the front of which is mounted a lower translucent cover 150.

The upper lightbox 300 is hinged to the lower lightbox 100 by way of a hinge arm 340 extending downwardly from the upper lightbox 300, and sitting within a hinge arm recess 140 formed in the lower housing 110. By virtue of this hinge arrangement, the upper lightbox 300 may pivot relative to the lower lightbox 100, so as to be movable between the closed position shown in FIG. 1 and the open position shown in FIG. 2.

To define a predetermined range of motion, the upper lightbox 300 is formed with angled portion 314 in the region of the housing adjacent the hinge arm 340, whilst the upper translucent cover 350 is provided with a corresponding cut out 352. The angled portion 314 and cut out 352 are arranged such that when the lower lightbox 300 rotates about the hinge 340 to the open position, the surface of the angled portion 314 and cut out portion 352 will come into alignment with the upper surface of the lower lightbox 100, as seen clearly in FIG. 2. In the closed position, the lower surface of the upper lightbox 300 comes into contact with the upper surface of the lower lightbox 100 along substantially the whole width of the clapperboard 1000, with the exception of the relatively small region defined by the angled portion 314 and cut out 352, as seen in FIG. 1.

In the open position, the upper lightbox 300 is angled at approximately 13 degrees relative to the lower lightbox 100 and a corresponding angle is defined by the angled portion 314 and the cut out 352 relative to the bottom surface of the upper lightbox 300. Although there is no particular limit to the angle by which the upper lightbox 300 may be opened relative to the lower lightbox 100, a limited range of motion is preferred. The upper lightbox 300 must be able to open far enough to function as a clapstick which can be impacted upon the slate defined by the lower lightbox 100 when closing the hinge, whilst limiting the extent of opening the hinge will reduce the impact of the clapstick against the slate to prevent damage and also facilitates the passage of wires through the hinge construction without complication, in order to power the light source in the upper lightbox 300. Accordingly, an opening angle of 10 degrees to 30 degrees is preferred, more preferably 12 degrees to 20 degrees, and in the present embodiment exemplified by an angle of 13 degrees as already noted.

It will be appreciated that other hinge arrangements are possible. For example, the hinge arm may instead be provided to extend from the lower lightbox 100, to sit within a hinge recess formed in the upper lightbox 300. Similarly, with either arrangement of the hinge arm and hinge arm recess, or another hinge arrangement, the angled portion and cut out may be provided to the lower lightbox 100 and lower translucent cover 150 instead of the upper lightbox 300 and upper translucent cover 350. The angled portion and cut out would be provided at the same angle relative to the upper surface of the lower lightbox 100, to limit the hinge opening to the same angle as when provided to the upper light box 300, the above preferred ranges of angles being equally applicable in either case.

In the embodiment shown in FIGS. 1 to 11, 12A and 12B, the lower and upper lightboxes 100, 300 have a common width of 300 mm, and a common depth of 50 mm. The lower lightbox 100 has a height of 220 mm, whilst the upper lightbox 300 has a height of 30 mm. Opening the hinge thus results in a gap between the upper surface of the lower lightbox 100 and the lower surface of the upper lightbox 300, at the end furthest from the hinge, of approximately 70 mm, measured vertically from the upper surface of the lower lightbox 100. Of course, these measurements are purely exemplary, and the clapperboard 1000 could be formed to any desired width and height. A depth of the clapperboard of at least 30 mm, and in the present example 50 mm, is nevertheless advantageous, since it remains in proportion to the other dimensions of the clapperboard, and at the same time allows the clapperboard to be self-supporting, and able to stand stably on the base of the lower lightbox 100 as depicted in FIGS. 1 and 2. Furthermore, a depth of at least 30 mm provides sufficient distance between the internal light sources and the translucent covers 150, 250 so as to provide an even light distribution over the surfaces of the translucent covers 150, 350. This even light distribution over the translucent covers 150, 350 permits any information written onto the translucent surfaces to be more easily legible under a variety of lighting conditions.

As also visible in FIG. 1, the lower lightbox 100 includes a charging port 112 located near the base of the lower lightbox 100 on the hinge side. The charging port 112 is arranged to receive the end connector of a charging cable, which is able to either directly power the light sources within the lower lightbox 100 and upper lightbox 300, and/or to charge batteries held within battery compartment 124 (see FIGS. 5, 6, 8 and 9 in particular). The charging port may, for example, be a USB, mini-USB or micro-USB port or another well-known charging port. A battery compartment cover 116 is also provided on the hinge side of the lower lightbox 100 and is preferably secured in place with threaded fasteners such as screws.

Adjacent the charging port 112 is a power switch 114. The power switch 114 may be a simple on/off switch for connecting and disconnecting power from the power sources (mains power connected via charging port 112 and/or the batteries in battery compartment 124) and the lighting circuit. More preferably, the power switch 114 may be a variable power switch, able to disconnect power from the lighting circuit or to connect the power sources to the lighting circuit at differing power levels. In a preferred example, the power switch has an "off" position, in which the power sources are disconnected from the lighting circuit, and two "on" positions, being a high power and a low power setting for connecting the lighting circuit to the power sources at two different power levels, such that the brightness of the light sources may be selected according to the ambient lighting conditions and user preference. The switch may be arranged between the power supply and a PCB of the lighting circuit to directly control the power level supplied to the lighting circuit, or a constant power level may be supplied to a PCB of the lighting circuit and the switch be arranged to control the power level output from the PCB to the light sources. In the present embodiment, a constant power level is supplied to the PCB (LED driver) and the power switch is located between the LED driver and the LED strips which serve as the light sources, to adjust the power supplied from the LED driver to the LED strips.

In a preferred embodiment, the power switch may be multi-functional and may be configured to be selectively able to turn on the upper and lower light sources when the hinge is closed; to turn on the upper and lower light sources when the hinge is open; and to allow the upper and lower light sources to be turned on by closing or opening of the hinge (and turned off by the reverse action). With a variable power on/off switch, these functions may be selectively enabled at two or more different power levels as described above. All or a selection of these functionalities could be made available.

In the embodiment shown in FIGS. 1 to 11, 12A and 12B, the clapperboard 1000 is provided with a further switch, responsive to whether the hinge is open or closed. Specifically, assuming the power switch 114 is set to an "on" position, the clapperboard 1000 is configured to supply power to the light sources when the hinge is closed, i.e. when the upper lightbox 300 or clapstick is shut onto the lower lightbox 100 or slate, as shown in FIG. 1, and to disconnect power from the light sources, so that they are turned off, when the hinge is in the open position so that the upper lightbox 300 or clapstick is separated from the lower lightbox or slate, as shown in FIG. 2. In this way, a visual light signal is given out at the same time as the audible sound signal when the clapstick is shut onto the slate. In this way, the clapperboard 1000 provides a visual synchronisation signal of the hinge closing and the two lightboxes coming together, at which time the upper and lower lightboxes illuminate to give a visible light signal simultaneously with the audible sound signal of the 'clap'. When used as a lightbox for providing ambient or directed light to a surrounding area, this also provides a convenient means for turning the power to the light sources on and off by rotating the upper lightbox 300 about the hinge relative to the lower lightbox 100.

It will be appreciated that, instead, the clapperboard 1000 could alternatively be configured to be illuminated when the hinge is open, and to turn off the light sources when the hinge is closed.

Figure 12A:
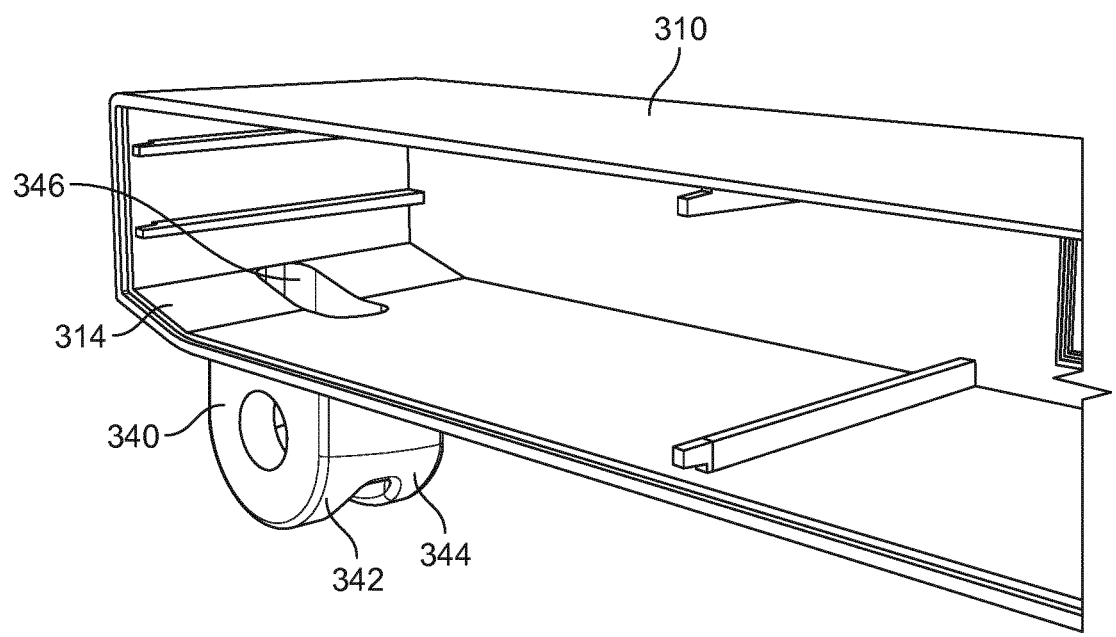
FIGS. 12A and 12B respectively show a front-right perspective view with translucent cover removed and a bottom perspective view of the hinge end of the clapstick of the clapperboard of FIGS. 1 to 11.
Figure 12B:
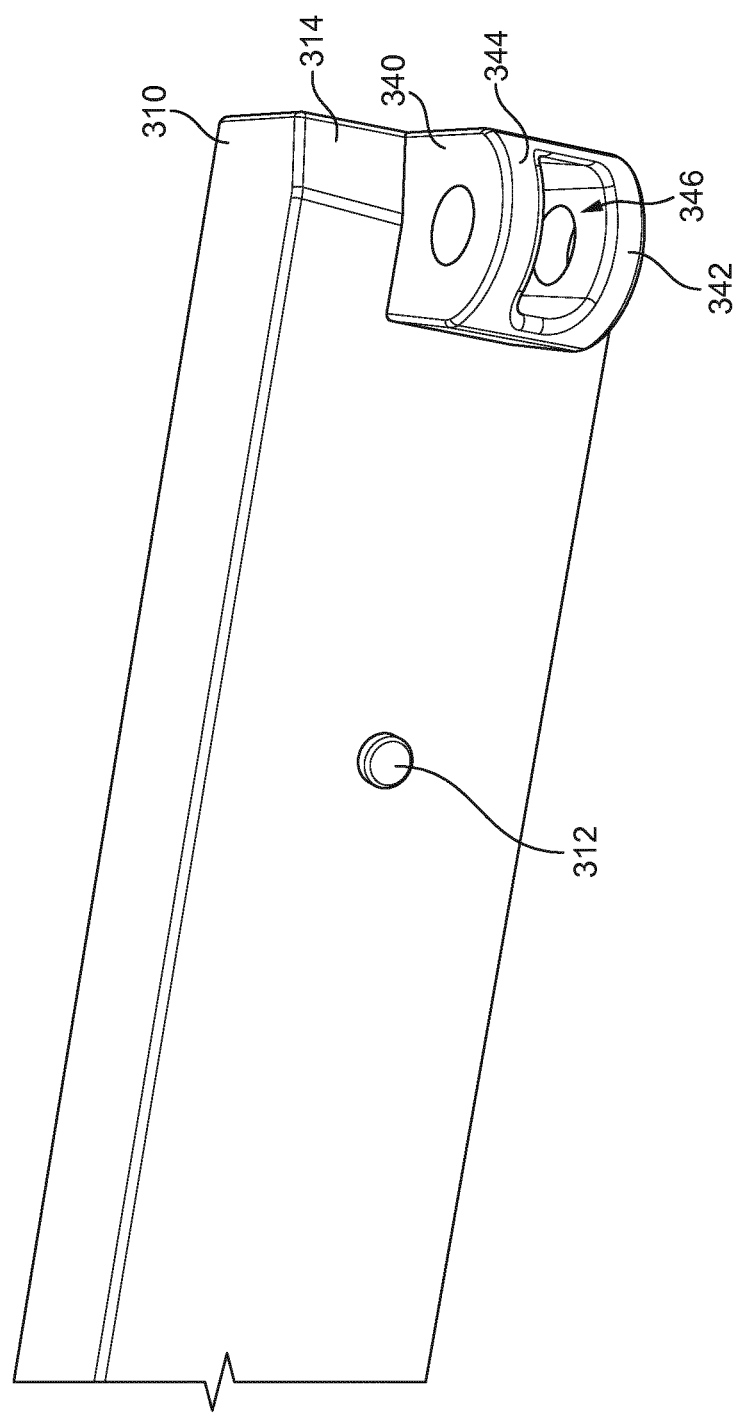

In the present embodiment, turning the light sources on and off in response to the hinge being open or closed is achieved through the use of a microswitch, mounted in the lower lightbox 100 and connected to the lighting circuit. The microswitch is mounted on a microswitch PCB 170 (see FIGS. 5, 6, 8 and 9, in particular). The microswitch is disposed directly below and/or partially within a microswitch contact hole 118, provided in the upper surface of the lower lightbox 100 and visible in FIGS. 2 to 5, 8 and 9. As shown in FIGS. 4 and 12B, a microswitch pusher 312 is provided on the lower surface of the upper lightbox 300, aligned with the microswitch contact hole 118, such that when the clapstick is shut the microswitch pusher 312 comes into contact with the microswitch to turn the switch on and provide power to the lighting circuit.

It will be appreciated that alternative switch arrangements could be provided, including, for example, providing the microswitch and microswitch contact hole at the lower surface of the upper lightbox 300 and providing the microswitch pusher on the upper surface of the lower lightbox 100. Additionally, an alternative type of switch other than a microswitch could be used.

Figure 3:
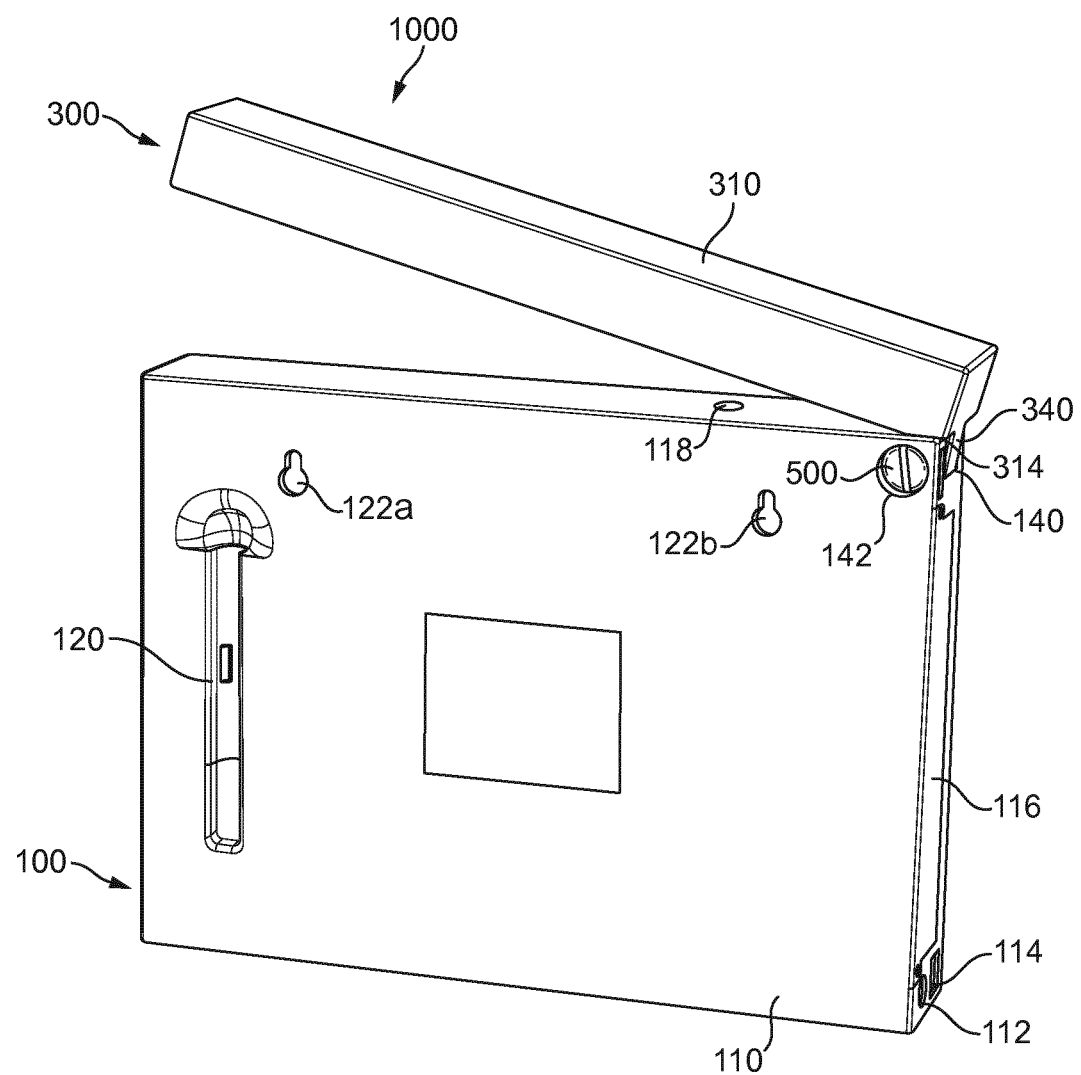
FIG. 3 shows a reverse perspective view of the clapperboard of FIGS. 1 and 2, with the clapstick open.
Figure 4:
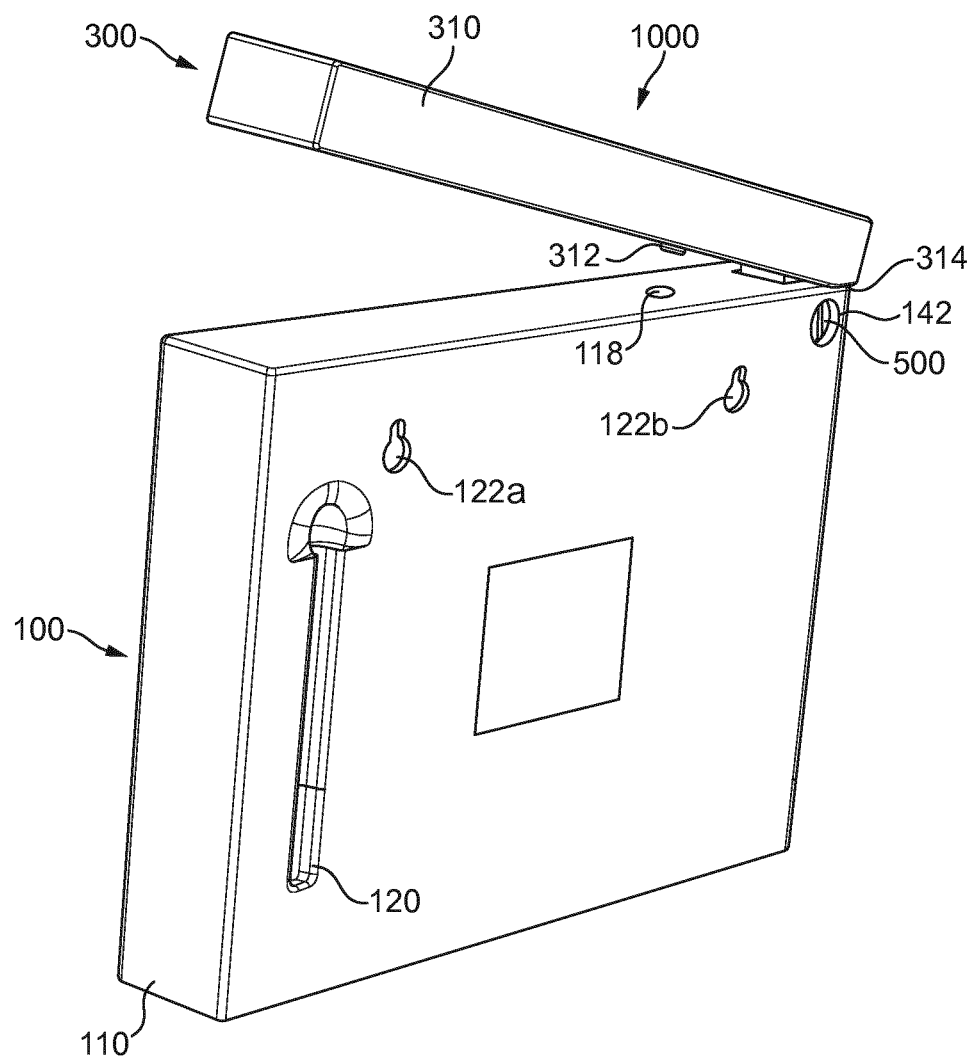
FIG. 4 shows a reverse perspective view, similar to that of FIG. 3 but from the opposite side, of the clapperboard of FIGS. 1 to 3, with the clapstick open.

Referring briefly to FIGS. 3 and 4, which shows the reverse view of the clapperboard 1000, it can be seen that the rear surface of the lower lightbox 100 is additionally provided with a pen-holding recess 120, which is shaped to contain and hold a felt pen in a vertical orientation, as well as having a finger access space at the top of the recess to facilitate easy removal of the pen. A felt pen, which may be provided together with the clapperboard, is suitable for writing on the translucent covers 150 and 350 of the lower lightbox 100 and upper lightbox 300, so as to display information on the clapperboard 1000, in a well-known manner. A translucent whiteboard material, which can be back-lit by the light sources in the lower lightbox 100 and upper lightbox 300 is suitable for this purpose, and allows the information written with the pen to be wiped clean and replaced with new information, as desired.

In alternative embodiments of the clapperboard 1000, a pen holding recess was contemplated which held the pen in a horizontal orientation, but it was discovered that felt pens held horizontally in this way had a tendency to dry out and become inutile. Accordingly, a non-horizontal (45 degrees or more from horizontal), and preferably predominantly vertical (within 22.5 degrees or less of vertical) pen-holding orientation is preferred for the recess 120.

Eyelets 122a, 122b are also provided, which may be used to hang the clapperboard 1000 from screws, nails or the like fixed in a wall or other hanging surface. In this manner, the clapperboard 1000 may be used to provide lighting at a desired location, and/or to display prominently the information written thereon.

Also visible in FIGS. 3 and 4 is an adjustable hinge pin 500 which is located in a recess 142 provided in the rear surface of the clapperboard 1000, and arranged to pass through the side walls of the hinge recess 140 and the hinge arm 340, through horizontal through holes provided for this purpose, in order to facilitate rotation of the upper lightbox 300 about the hinge relative to lower lightbox 100. The hinge arrangement is later described in further detail below.

Figure 5:
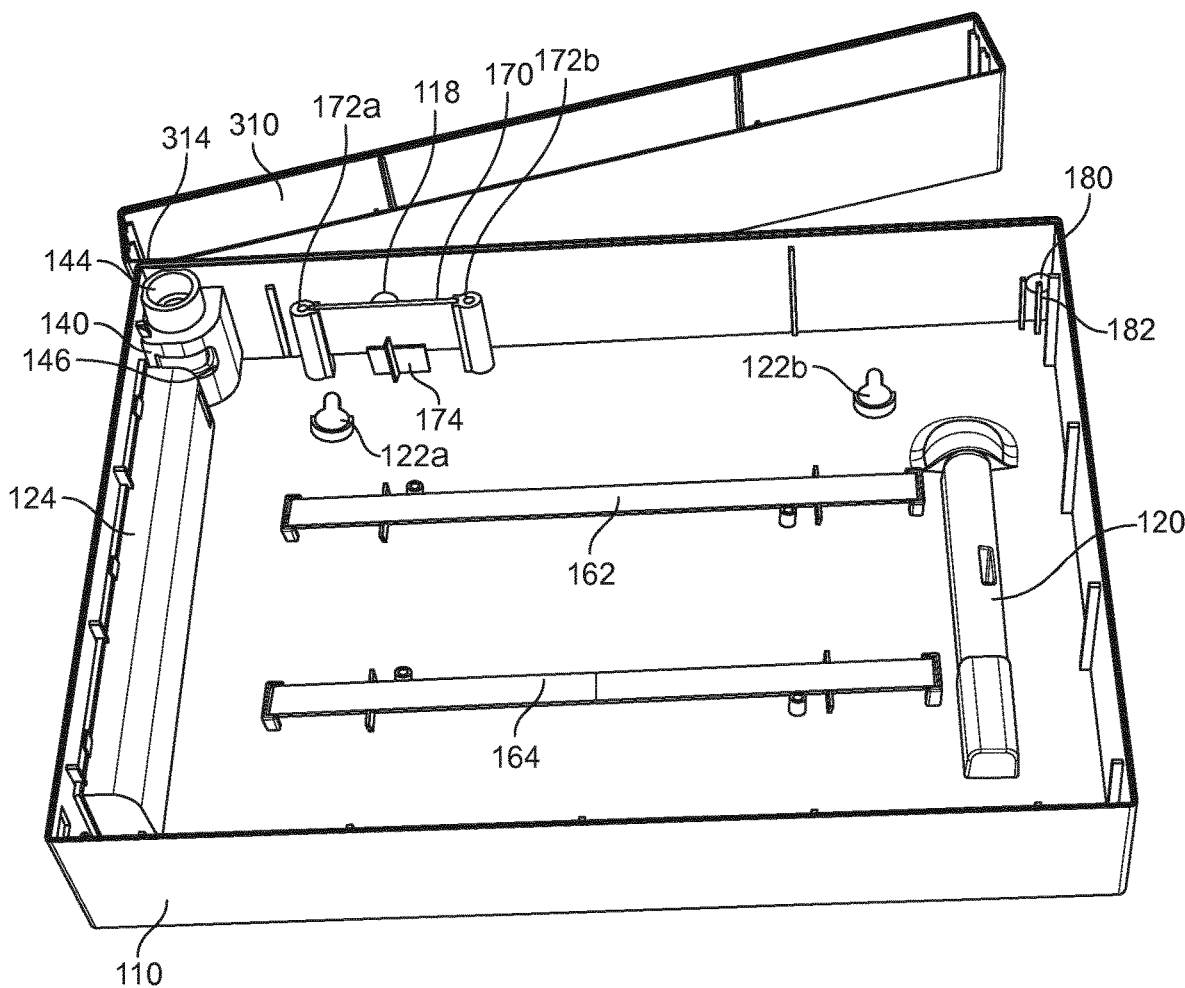
FIG. 5 shows a bottom-front perspective view of the clapperboard of FIGS. 1 to 4, open and with the translucent front covers removed from the upper and lower housings.
Figure 6:
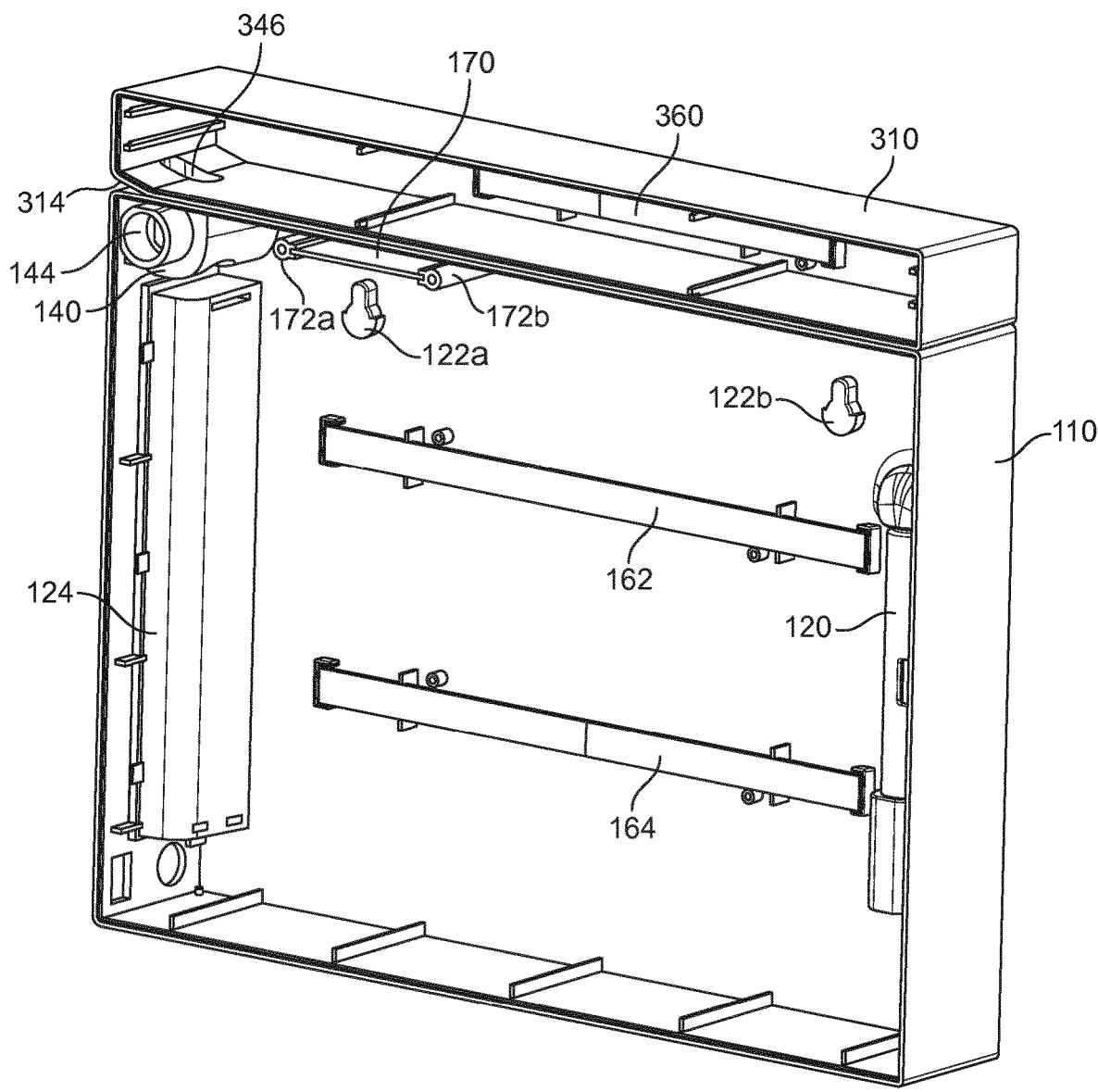
FIG. 6 shows a front-right perspective view of the clapperboard of FIGS. 1 to 5, closed and with the translucent front covers removed from the upper and lower housings.

Turning next to FIGS. 5 and 6, details of the internal construction of the clapperboard 1000 can be seen, the lower and upper translucent covers 150, 350 having been removed in these Figures. It is noted that details of the wiring used to connect the components of the lighting circuit are not shown in these Figures, but any suitable wiring loom arrangement may be used in order to interconnect the power sources, power switch, light sources and microswitch PCB.

The housing 110 of the lower lightbox 100 is preferably formed of moulded or extruded plastic and may have the pen holding recess 120, hinge recess 140 and a hinge pin connector recess 144, as well as the battery compartment 124 and eyelets 122a and 122b, integrally moulded therewith. The lower housing 110 further provides strengthening ribs, spaced around the inside of the upper, lower and side walls of the housing 110 to provide structural strength. The housing may also include integrally-moulded mounting points for the light sources 162 and 164, microswitch PCB 170, and such further components as may be desired.

As shown in FIGS. 5 and 6, the light sources provided in the lower lightbox 100 and upper lightbox 300 are LED strips, a top LED strip 162 and bottom LED strip 164 being provided in the lower lightbox housing 110 and an LED strip 360 (see FIG. 6) provided in the upper lightbox 300. The LED strips 162, 164 and 360 are connected by wires to the microswitch PCB 170. The microswitch PCB is connected by wires to the power switch 114 (not shown in FIGS. 5 and 6) and the power source provided by the batteries in compartment 124 and the mains power supply from charging port 112. As illustrated, the LED strips 162, 164 and 360 are mounted to mounting points integrally moulded onto the back panels of the lower housing 110 and upper housing 310, respectively, so as to maintain a gap between the LED strips 162, 164 and 360 and the respective upper and lower translucent covers 150, 350, in order to provide a uniform light distribution across the translucent covers 150, 350.

Figure 10:
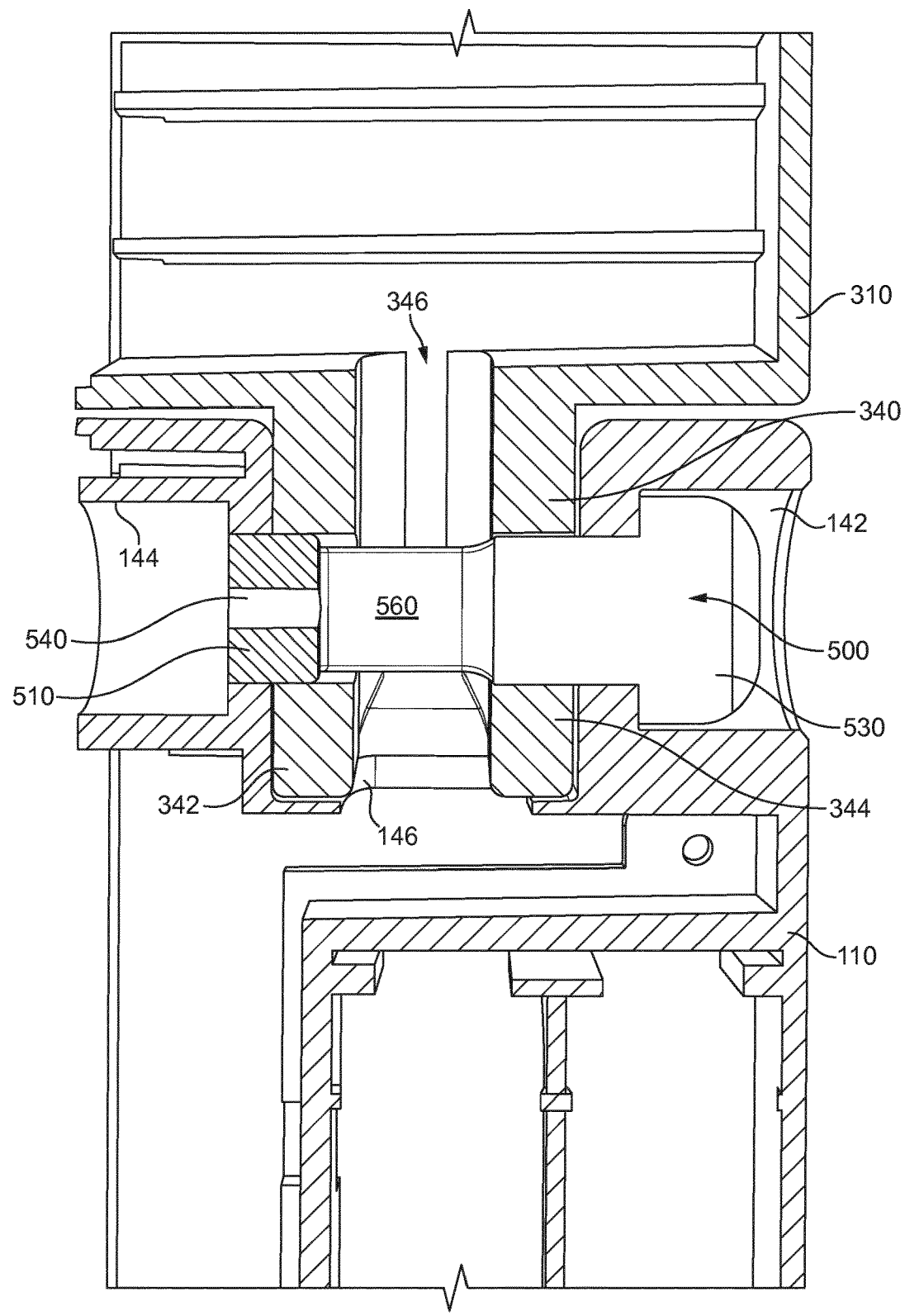
FIG. 10 shows a vertical cross-sectional view through the centre of the hinge of the clapperboard of FIGS. 1 to 9, viewed in the direction towards the left, hinged side of the clapperboard (that is, towards the left side as shown in FIGS. 1, 2 and 5 to 9)

Upper housing 310 is, similarly, preferably made from moulded or extruded plastic, having the mounting points for the LED strip 360 integrally moulded therewith, as well as mounting points for any desired further components. Similarly, reinforcing ribs are provided spaced around the upper, lower and side walls of the upper housing 310. Hinge arm 340, best seen in FIGS. 10, 12A and 12B, is also integrally moulded with the upper housing 310.

As best seen in FIGS. 5, 6, 8 and 9, the microswitch PCB 170 is secured to two mounting points 172a and 172b close to the upper wall of the lower lightbox housing 110, so as to position the microswitch immediately below and/or partially within the microswitch contact hole 118. Mounting points 172a and 172b are integrally moulded with the lower housing 110, and are adapted to connect to the left- and right-hand sides of the microswitch PCB 170 for ease of assembly and to facilitate the necessary electrical connections to the wires of the lighting circuit on other sides and surfaces of the PCB.

Figure 8:
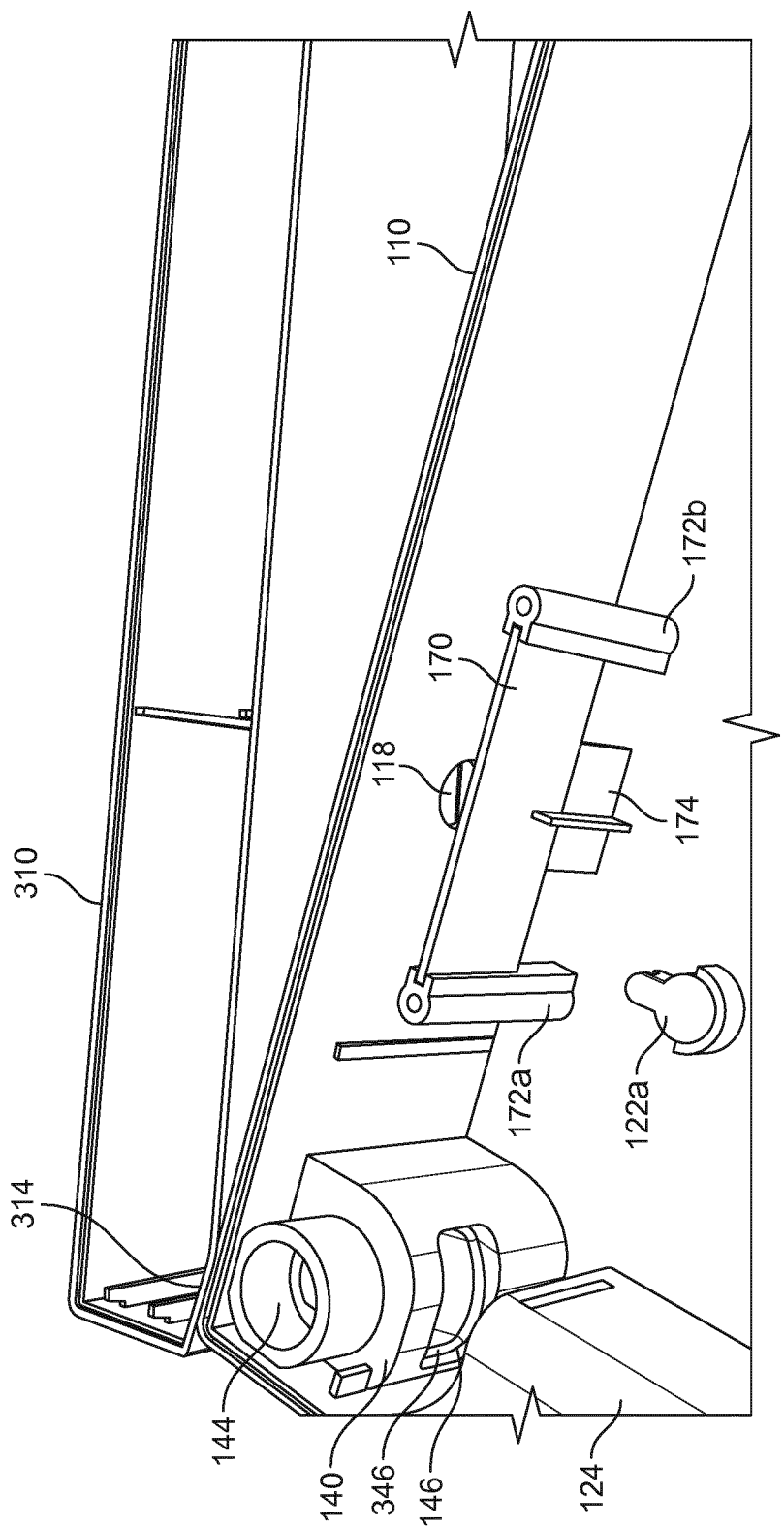
FIG. 8 shows an enlarged view of the hinge portion of the clapperboard of FIGS. 1 to 7, with the clapstick open and the translucent front covers removed from the upper and lower housings.
Figure 9:
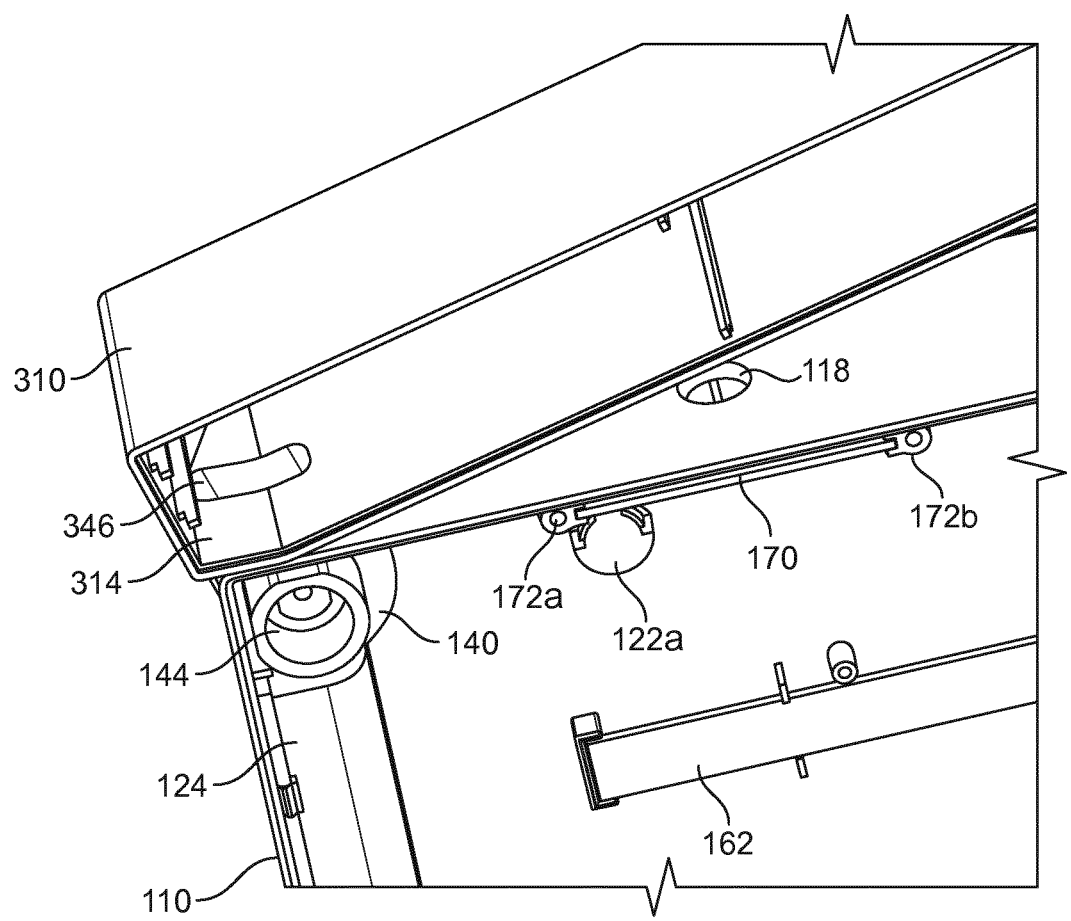
FIG. 9 shows another enlarged view of the hinge portion of the clapperboard of FIGS. 1 to 8 from a more elevated position than in FIG. 8, with the clapstick open and the translucent front covers removed from the upper and lower housings.

As can be seen, the microswitch (not specifically illustrated) will be arranged on the PCB to be positioned substantially centrally between the mounting points 172a and 172b, facing the microswitch contact hole 118. However, it was discovered that, upon closing the clapstick 300, to engage the microswitch pusher 312 with the microswitch, the force necessary to depress the microswitch could deform the microswitch PCB 170. Accordingly, a PCB support strut 174 is additionally provided, integrally moulded with the lower housing 110, to provide structural support under the lower surface of the microswitch PCB 170 in the vicinity of the microswitch. Alternative strengthening or support arrangements can be provided, but the provision of support strip 174 at an intermediate portion of the microswitch PCB 170 is a low-cost and effective solution that does not require unnecessarily increasing the thickness of the microswitch PCB 170, nor the provision of additional separate components, for structural integrity. The arrangement of PCB support strip 174 is best seen in FIG. 8.

Figure 7:
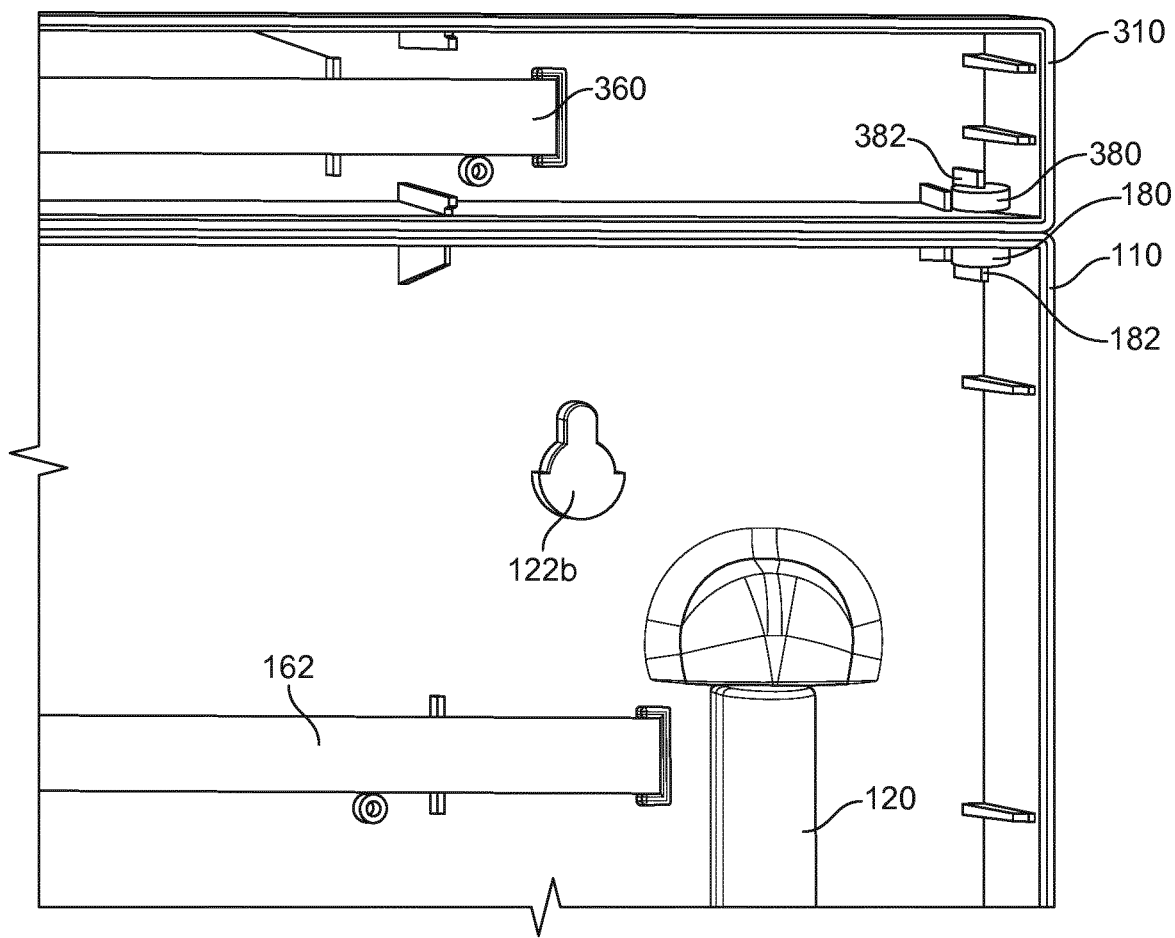
FIG. 7 shows an enlarged view of the non-hinged, openable end of the clapperboard of FIGS. 1 to 6, with the clapstick closed and the translucent front covers removed from the upper and lower housings.

With reference to FIG. 5 and, in particular, FIG. 7, an additional problem was identified in connection with the use of the microswitch. Upon closing the upper lightbox 300 or clapstick onto the lower lightbox 100 or slate, the microswitch pusher 312 locates into the microswitch contact hole 118 to depress the microswitch. However, upon releasing the upper lightbox 300 or clapstick, the microswitch has a tendency to push back against the microswitch pusher 312 and so partially open the clapstick or upper lightbox 300. This can result in the microswitch undesirably turning off the lighting circuit, or otherwise simply an inelegant arrangement in which the upper lightbox 300 is not correctly aligned with the lower lightbox 100 in the closed position.

To address this problem, the lower housing 110 and the upper housing 310 are each provided with magnetic clasp retainer fingers 182, 382, respectively, integrally moulded with the housings 110, 310, and arranged to hold respective lower magnetic clasp member 180 and upper magnetic clasp member 380. As shown in FIG. 7, when the upper lightbox 300 is rotated around the hinge to bring it into the closed position, the magnetic clasp members 180, 380 are magnetically attracted to one another and serve to hold the non-hinged end of the upper housing 310 in contact with the lower housing 110, ensuring that the microswitch remains depressed and that supply of power to the lighting circuit is ensured.

Use of magnetic clasp members 180, 380 provides a secure non-mechanical solution for holding the clapstick 300 closed shut against the slate 100.

When using moulded or extruded plastic to form the upper housing 310, it is desirable to minimise the thickness of the walls in order to reduce the amount of material required to manufacture the clapperboard 1000, and commensurately the associated material costs. In some cases, however, the resilient microswitch may tend to push up against the microswitch pusher 312, and so tend to deform the lower surface of the upper housing 310. To resist this, and in order to provide greater structural integrity whilst maintaining substantially unobstructed transmission of light within the upper lightbox 300, a post or strut (not shown) may be positioned in the upper lightbox 300 between the upper and lower walls of the upper housing 310, at the location above the microswitch pusher 312.

With particular reference to FIGS. 8 to 11, 12A and 12B, further details of the hinge construction will now be given.

As shown in FIGS. 12A and 12B, the upper lightbox 300 is provided with a hinge arm 340 extending downwardly from the lower surface of the upper housing 310. The hinge arm is formed with a vertical through hole 346 extending from the inside of the upper housing 310 downwardly through the hinge arm 340, so that the lower end of the hinge arm 340 is split into two prongs 342, 344. A horizontal through hole (not labelled) also extends through the hinge arm 340, for receiving the hinge pin 500.

Figure 11:
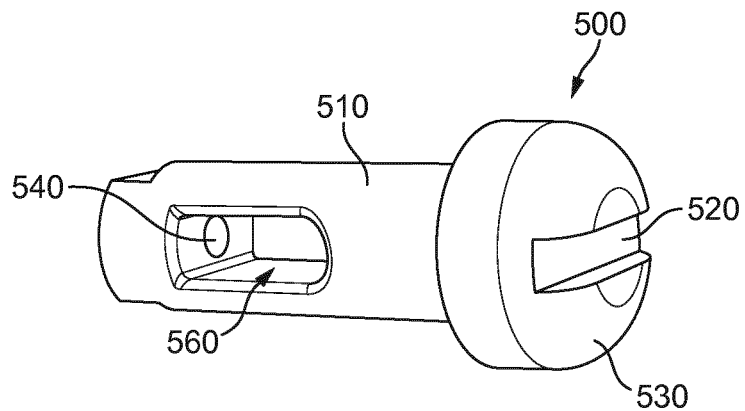
FIG. 11 shows an enlarged perspective view of the hinge pin of the clapperboard of FIGS. 1 to 10.

Hinge pin 500 is shown in FIG. 11, and includes a substantially cylindrical body 510 having a vertical through hole 560 arranged to align with the through hole 346 in the hinge arm 340. The hinge pin 500 has a head 530 at one end including a torque-applying slot 520 for receiving a flat head screwdriver, or a coin or the like, so as to apply or resist twisting forces about a longitudinal axis of the hinge pin 500. The opposing end of the hinge pin 500 includes a through hole 540 arranged to receive a threaded fastener such as a screw.

Referring to FIG. 10, it can be seen that the hinge arm 340 is configured to fit within the hinge arm recess 140 (not labelled on FIG. 10) formed in the lower housing body 110.

The hinge arm recess similarly includes a horizontal through hole for receiving the hinge pin 500, arranged to align with the horizontal through hole in the hinge arm 340. The body 510 of hinge pin 500 closely fits within the horizontal through holes of both the hinge arm 340 and the hinge arm recess 140, so as to permit rotation of the upper housing body 310 relative to the lower housing body 110, whilst maintaining alignment of the upper lightbox 300 relative to the lower lightbox 100.

As can be seen, the head 530 of the hinge pin 500 is arranged to be received in the hinge pin receiving recess 142 on the rear side of the lower housing body 110, whilst the end of the hinge pin body 510 at the opposing end of the hinge pin 500 terminates at the base of hinge pin connector recess 144. The hinge pin connector (not shown) is a threaded connector for securing the end of the hinge pin 500. This may take the form, by way of example, of a threaded fastener such as a screw, coupled with a washer, to secure the hinge pin 500 against lateral, horizontal motion (to the right in FIG. 10).

As shown in FIGS. 8 and 10, the hinge arm recess 140 also has a through hole 146 at the bottom side thereof, aligned with the through hole 346 in hinge arm 340 and the through hole 560 in hinge pin 500. This provides a continuous passage, thereby allowing a wire that is connected to LED strip 360 to pass from the upper housing 310 through the hinge into the lower lightbox 110, to be connected to the microswitch PCB 170. In this way, power can be supplied to the light source 360 in the upper lightbox 300 without any complex arrangement for power transfer or the need for a separate power supply for the upper lightbox 300. The lower end of through hole 346 in the hinge arm 340 is shaped to extend further around the arc of the hinge arm 340 lower end than the width of through hole 146, such that a vertical passage will remain clear for the wire to pass through regardless of whether the hinge is in the open or closed position.

The adjustable hinge pin 500 is additionally arranged so that when the hinge pin connector, such as a screw, is located in the hinge pin connector recess 144 and threaded into the connector hole 540, a horizontal clamping force is generated, compressing the walls of the connector recess 144 and the hinge pin receiving recess 142 together so as to come into contact with and press against the front and back surfaces of the hinge arm 340. In this way, a variable frictional force can be established between the hinge arm 340 and the front and back sides of the hinge arm recess 140 in which it rests. In particular, the present inventors identified that if the friction in the hinge is too great, the clapstick 300 cannot readily be shut against the slate 100, whereas with too small a frictional force between the hinge arm 340 and the hinge arm recess 140, the clapstick 300 will not stay open and will tend to fall shut against the slate 100 under the force of gravity. Accordingly, the adjustable hinge pin 500 is used with a suitable threaded connector to provide a variable frictional force, thereby ensuring that the clapperboard remains functional to allow the upper lightbox 300 to pivot relative to the lower lightbox 100, but able, when desired, to maintain the hinge open with the upper lightbox 300 raised to the open position and the angled portion 314 in contact with the upper surface of the lower lightbox 100.

The torque-applying slot 520 is also aligned with the vertical through hole 560 in the hinge pin 500, so as to permit visual assessment to ensure that the through hole 560 remains vertical for the passage of the wire therethrough, during and after tightening of the hinge connector piece to ensure the correct frictional engagement.

The foregoing description of the exemplary embodiments of the invention has been made by way of example only and is in no way intended to limit the scope of the claims. Many modifications and alterations to the disclosed embodiments are considered possible without departing from the teaching of the present invention as imparted to a person skilled in the art by the foregoing disclosure. All such modifications and variations are intended to be encompassed within the scope of the invention as defined by the appended claims.

The invention claimed is:

1. A device being an illuminated clapperboard or a lightbox formed as a clapperboard and comprising:
    a lower lightbox; and
    an upper lightbox arranged on top of the lower lightbox and connected thereto at one side by a hinge,
    wherein the lower lightbox contains a lower light source and includes a wholly or partially translucent or transparent lower cover on a vertical front side of the lower lightbox,
    wherein the upper lightbox contains an upper light source and includes a wholly or partially translucent or transparent upper cover on a vertical front side of the upper lightbox,
    wherein a switch is arranged to turn on the upper and lower light sources when the hinge is closed and to turn off the upper and lower light sources when the hinge is opened, or wherein the switch is arranged to turn off the upper and lower light sources when the upper lightbox is closed and to turn on the upper and lower light sources when the upper lightbox is opened.

2. The device of claim 1, wherein the switch is provided in the lower lightbox and arranged to be pressed closed when the hinge is closed and to open or be opened when the hinge is opened.

3. The device of claim 2, wherein the switch is a microswitch attached to printed circuit board (PCB) that is mounted at both sides on two PCB mounting points in a housing of the lower lightbox, and the lower lightbox includes a PCB support strut located intermediate of the two PCB mounting points and arranged to support the PCB in a vicinity of the microswitch when a force is applied to press the microswitch closed.

4. The device of claim 2, wherein the upper lightbox includes a switch pusher extending from a lower surface of the upper lightbox and arranged to press the switch closed through a contact hole in an upper surface of the lower lightbox when the hinge is closed.

5. The device of claim 4, wherein a substantially vertical support strut or rod is provided between upper and lower surfaces of a housing of the upper lightbox located substantially above the switch pusher.

6. The device of claim 1, wherein the switch is provided in the upper lightbox and arranged to be pressed closed when the hinge is closed and to open or be opened when the hinge is opened.

7. The device of claim 6, wherein the switch is a microswitch attached to a printed circuit board (PCB) that is mounted at both sides on two PCB mounting points in a housing of the upper lightbox, and the upper lightbox includes a PCB support strut located intermediate of the two PCB mounting points and arranged to support the PCB in a vicinity of the microswitch when a force is applied to press the microswitch closed.

8. The device of claim 6, wherein the lower lightbox includes a switch pusher extending from its upper surface and arranged to press the switch closed through a contact hole in the lower surface of the upper lightbox when the hinge is closed.

9. The device of claim 1, wherein the lower lightbox and the upper lightbox have substantially the same width and depth, such that the lower surface of the upper lightbox substantially coincides with an upper surface of the lower lightbox when the hinge is closed.

10. The device of claim 1, wherein the upper lightbox includes an inclined portion adjacent the hinge formed at an angle to a lower surface of the upper lightbox and arranged to contact an upper surface of the lower lightbox to limit the hinge against further opening,
    wherein the inclined portion is arranged to limit an opening angle of the hinge to a maximum angle between 10 and 30 degrees,
    optionally wherein the inclined portion is formed at said maximum angle relative to the lower surface of the upper lightbox.

11. The device of claim 1, wherein a front surface of the lower lightbox is substantially aligned with a front surface of the upper lightbox.

12. The device of claim 1, wherein the hinge is arranged to selectively be held in an open position, and preferably wherein a friction force in the hinge is adjustable such that friction in the hinge can be set to hold the hinge in the open position, with the upper lightbox rotated relative to the lower lightbox to open a gap between a lower surface of the upper lightbox and an upper surface of the lower lightbox.

13. The device of claim 1, wherein the lower lightbox includes a pen-holding recess arranged to hold a pen in a non-horizontal orientation of at least 45 degrees from horizontal, and preferably in a predominantly vertical orientation of not more than 22.5 degrees from vertical, most preferably in a substantially vertical orientation.

14. The device of claim 13, wherein the upper lightbox includes a hinge arm arranged to be received in a hinge arm recess of the lower lightbox, the hinge arm and the hinge arm recess including substantially vertical through holes for a wire to pass through,
- or wherein the lower lightbox includes a hinge arm arranged to be received in a hinge arm recess of the upper lightbox, the hinge arm and the hinge arm recess including substantially vertical through holes for the wire to pass through,
- and optionally further including a hinge pin, the hinge pin including a substantially vertical through hole for the wire to pass through.

15. The device of claim 1, wherein a depth of the lower lightbox between its back and front surfaces is at least 30 mm, and wherein a depth of the upper lightbox between its back and front surfaces is at least 30 mm.

16. The device of claim 1, wherein the lower lightbox includes a lower housing containing a power source and/or a port for connection to a power source, and the hinge includes a through hole with a wire arranged to pass through it to connect the power source to the upper lightbox.

17. The device of claim 1, further comprising a magnetic catch to hold the hinge closed with the lower surface of the upper lightbox in contact with an upper surface of the lower lightbox.

18. The device of claim 1, further including a variable power switch for varying a power supply to the lower and upper lightboxes,
- wherein the variable power switch is operable to select between a high power setting and a low power setting, and optionally is further operable to turn off power to the lower and upper lightboxes.

19. The device of claim 1,
- wherein the upper lightbox is a clapstick,
- wherein the lower light source will illuminate the translucent or transparent lower cover from within the lower lightbox, and
- wherein the lower lightbox and the clapstick have substantially the same width and depth.

20. The device of claim 19, wherein the switch is arranged to be pressed closed when the clapstick is closed and to open or be opened when the clapstick is opened.

21. The device of claim 20, wherein the switch is a microswitch attached to a PCB that is mounted at both sides on PCB mounting points in a housing of the lightbox.

22. The device of claim 19, wherein the clapstick is arranged to selectively be held in an open position.

23. The device of claim 19, wherein the depth of the lower lightbox between its back and front surfaces is at least 30 mm, preferably at least 40 mm, most preferably at least 50 mm.

24. The device of claim 19, wherein the depth of the clapstick between its back and front surfaces is at least 30 mm, preferably at least 40 mm, most preferably at least 50 mm.

25. The device of claim 19, wherein the lower lightbox includes a housing containing a power source and/or a port for connection to a power source.

26. The device of claim 19, wherein the device is configured to generate an audible signal when the clapstick is closed.

27. A device being an illuminated clapperboard or a lightbox formed as a clapperboard and comprising:
- a lower lightbox;
- an upper lightbox arranged on top of the lower lightbox and connected thereto at one side by a hinge; and
- a magnetic catch to hold the hinge closed with the lower surface of the upper lightbox in contact with an upper surface of the lower lightbox.

28. A device being an illuminated clapperboard or a lightbox formed as a clapperboard and comprising:
- a lower lightbox;
- an upper lightbox arranged on top of the lower lightbox and connected thereto at one side by a hinge; and
- a variable power switch for varying a power supply to the lower and upper lightboxes, wherein the variable power switch is operable to select between a high power setting and a low power setting, and optionally is further operable to turn off power to the lower and upper lightboxes.

* * * * *